United States Patent [19]
La Porta et al.

[11] Patent Number: 6,081,715
[45] Date of Patent: Jun. 27, 2000

[54] METHOD AND SYSTEM FOR DISTRIBUTED CONTROL IN WIRELESS CELLULAR AND PERSONAL COMMUNICATION SYSTEMS

[75] Inventors: Thomas F. La Porta, Thornwood, N.Y.; Ramachandran Ramjee, Matawan; Malathi Veeraraghavan, Atlantic Highlands, both of N.J.

[73] Assignee: Lucent Technologies Inc., Murray Hill, N.J.

[21] Appl. No.: 08/819,929

[22] Filed: Mar. 18, 1997

Related U.S. Application Data

[62] Division of application No. 08/324,427, Oct. 17, 1994.

[51] Int. Cl.[7] .............................. H04Q 7/20; H04Q 7/22
[52] U.S. Cl. ..................... 455/445; 455/445; 455/432; 455/433; 455/434; 455/435; 370/312; 370/331; 370/338; 370/390
[58] Field of Search ................... 455/445, 432, 455/433, 434, 435, 436, 437, 438, 439, 440, 441, 442, 550, 561, 552, 422; 370/312, 331, 338, 390, 396, 522

[56] References Cited

U.S. PATENT DOCUMENTS

| 5,408,419 | 4/1995 | Wong ...................................... 455/436 |
| 5,497,412 | 3/1996 | Lannen et al. ........................... 455/432 |
| 5,528,583 | 6/1996 | Acampora et al. ...................... 455/436 |
| 5,539,744 | 7/1996 | Chu et al. ................................. 455/422 |

FOREIGN PATENT DOCUMENTS

| 0 369 535 A2 | 5/1990 | European Pat. Off. ......... H04Q 7/04 |
| 0 426 269 A1 | 5/1991 | European Pat. Off. ......... H04Q 7/04 |
| 0 475 865 A2 | 3/1992 | European Pat. Off. ......... H04Q 7/04 |
| 0 512 962 A2 | 11/1992 | European Pat. Off. ......... H04Q 7/04 |
| 0 546 758 A2 | 6/1993 | European Pat. Off. ......... H04Q 7/04 |
| 0 562 374 | 9/1993 | European Pat. Off. ......... H04Q 7/04 |
| 2 243 976 | 11/1991 | United Kingdom ............. H04Q 7/04 |
| 2 273 424 | 6/1994 | United Kingdom ............. H04Q 7/04 |
| 2 275 389 | 8/1994 | United Kingdom ........... H04Q 11/04 |
| 2 309 607 | 7/1997 | United Kingdom ........... H04B 10/18 |
| 92/13428 | 8/1992 | WIPO ............................. H04Q 7/04 |
| 93/06685 | 4/1993 | WIPO ........................... H04M 11/00 |
| 94/01978 | 1/1994 | WIPO ............................. H04Q 7/04 |
| 94/05129 | 3/1994 | WIPO ............................. H04Q 7/04 |
| 95/04420 | 2/1995 | WIPO ............................ H04L 12/56 |
| 95/14343 | 5/1995 | WIPO ........................... H04M 11/00 |

Primary Examiner—Wellington Chin
Assistant Examiner—Keith Ferguson

[57] ABSTRACT

A system for distributed control in wireless cellular and personal communication systems includes separate servers for performing call control and connection control functions, thereby obviating the need for a mobile switching or other switch to be anchored for the duration of a call. During a registration procedure, visiting location servers track only roaming mobiles, rather than tracking both roaming mobiles as well as mobiles located in their home network. Direct signalling links between servers and base stations, or other servers, located in different networks allow roaming mobiles to contact their home networks for service at all times, thereby obviating the need for passing signalling information for mobiles when they are not involved in a call. The use of multicast signalling with asynchronous transfer mode switches, permits specified channel control functions to take place concurrently in channel servers associated with base station and switches that form a segment of the route for a call. Similarly, specified call control functions are performed concurrently with mobile location functions, thereby decreasing the delays in setting up a call.

17 Claims, 12 Drawing Sheets

FIG. 11A

| INPUT DATA FOR THE ANALYSIS | |
|---|---|
| PARAMETER | VALUE |
| NUMBER OF USERS PER NETWORK | 3.75 MILLION |
| NUMBER OF NETWORKS | 11 |
| DENSITY OF MOBILES | 150 SQUARE MILES (SQ. MI.) |
| AREA PER NETWORK | 25000 SQ. MI. |
| AREA PER BASE-STATION | 25 SQ. MI. |
| VELOCITY OF MOBILE | 50 MILES/HOUR |
| % OF USERS ROAMING | 10% |
| RATE OF MOBILE POWERING-ON AND OFF | 2 PER DAY |
| RATE OF CALL ORIGINATION AND DELIVERY | 1.4/HR/TERMINAL |
| NUMBER OF USERS PER LOCATION SERVER PAIR | 37500 |
| NUMBER OF SWITCHES PER CLUSTER | 5 |
| NUMBER OF NEIGHBORING BASE-STATIONS | 6 |

FIG. 11B

| INPUT DATA FOR CONNECTION SERVER UTILIZATION ANALYSIS | |
|---|---|
| PARAMETER | VALUE |
| UPDATE PROCESSING TIME | 5 MS |
| INVOCATION PROCESSING TIME | 10 MS |

| INPUT DATA FOR BASE-STATION ANALYSIS | |
|---|---|
| PARAMETER | VALUE |
| PAGE PROCESSING TIME | 2 MILLISECONDS (MS) |
| REGISTRATION PROCESSING TIME | 4 MS |
| ORIGINATION (RELEASE-ORDER) PROCESSING TIME | 4 MS |
| INVOCATION PROCESSING TIME | 5 MS |
| HANDOFF PROCESSING TIME | 5 MS |
| HOLDING TIME OF A CONNECTION | 3 MINUTES |

FIG. 11C

| PARAMETER | VALUE |
|---|---|
| NUMBER OF CLUSTERS/NETWORK | 81 |
| NUMBER OF BASE-STATIONS/CLUSTER | 12 |
| MAX. NUMBER OF ATM SIGNALING LINKS FROM A NODE (LOCATION SERVER) | 245 |
| MAX. UPDATE RATE (VISITOR LOCATION SERVER) | 700,000/HOUR |
| MAX. OPERATION INVOCATION RATE (VISITOR LOCATION SERVER) | 262,000/HOUR |
| BASE-STATION UTILIZATION | 0.21 |
| CONNECTION SERVER UTILIZATION | 0.8 |

FIG. 12

METHOD AND SYSTEM FOR DISTRIBUTED CONTROL IN WIRELESS CELLULAR AND PERSONAL COMMUNICATION SYSTEMS

This is a divisional of copending application(s) Ser. No. 08/324,427 filed on Oct. 17, 1994.

FIELD OF THE INVENTION

The present invention relates generally to communication systems using wireless cellular and personal communication networks, and, in particular, to methods and apparatus for distributed control in such networks.

BACKGROUND OF THE INVENTION

In current cellular networks, three functions are performed in order to establish a call or connection to a mobile unit or mobile in such a network: (1) locating the mobile; (2) handling any implicit services to which a user may have subscribed; and (3) establishing the connection. These functions, may be referred to, respectively, as mobile location, call control, and connection control. In some networks, authentication functions are also performed.

During registration of a mobile in current cellular networks, a user profile is sent from a home network to a Visitors' Location Register (VLR) in the network in which the mobile user is currently located. A Mobile Switching Center (MSC) then obtains the user's profile from the VLR either during registration or during call delivery in order to provide signalling services for the mobile user. One disadvantage of this technique is that sending the user profile requires the sharing of competitive information between different networks. A second disadvantage is that signalling traffic is generated even when the mobile is not involved in a call.

Also, in typical current cellular networks, the function of locating the mobile is performed, in a sequential manner, prior to the function of performing call control and establishing the connection. The sequential nature of current procedures leads to long setup delays.

Finally, in typical current cellular networks, the MSC, is required to be an anchor for the duration of the call. The MSC thus remains involved for the duration of a call even if there exists a more efficient route for the user information path.

SUMMARY OF THE INVENTION

The present invention comprises a system and methods for distributed control in wireless cellular and personal communication systems. The system includes separate servers for performing call control and connection control functions, thereby obviating the need for a mobile switching or other switch to be anchored for the duration of a call. During a registration procedure, visiting location servers track only roaming mobiles, rather than tracking both roaming mobiles as well as mobiles located in their home network. Direct signalling links between servers and base stations, or other servers, located in different networks allow roaming mobiles to contact their home networks for service at all times, thereby obviating the need for passing signalling information for mobiles when they are not involved in a call. The use of multicast signalling with asynchronous transfer mode switches, permits specified channel control functions to take place concurrently in channel servers associated with base station and switches that form a segment of the route for a call. Similarly, specified call control functions are performed concurrently with mobile location functions, thereby decreasing the delays in setting up a call.

The system of the present invention may suitably comprise a plurality of networks each of which includes a home location server, a visitor location server, a roamer call server, and a plurality of clusters. Each cluster may comprise a call server, a connection server, a plurality of base stations each having a channel server associated with it, a plurality of switches each of which has a channel server associated with it, and a plurality of signalling transfer points. The system also may comprise a plurality of end systems, including a plurality of mobiles, where each mobile has a home network.

Other features and advantages of the present invention will be readily apparent by reference to the following detailed description and accompanying drawings.

BRIEF DESCRIPTION OF THE DRAWINGS

FIGS. 11A, 11B and 11C show exemplary values of input parameters used in an analysis of the system of FIG. 1.

FIG. 12 shows exemplary resulting values of certain parameters based upon the exemplary input values in FIGS. 11A–11C.

DETAILED DESCRIPTION

Figure 1:
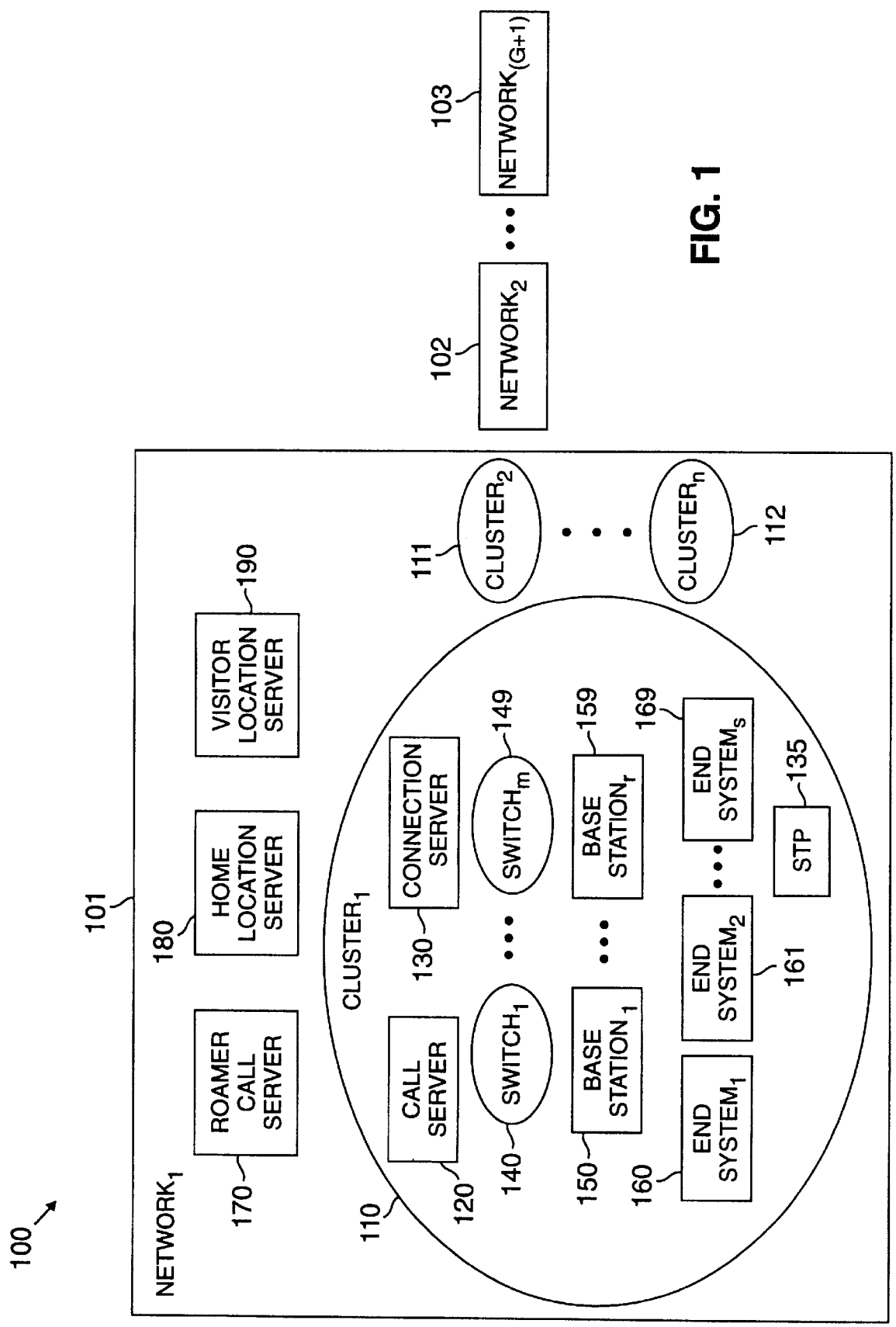
FIG. 1 is a block diagram illustrating a cluster-based multi-network system for the transfer of data or voice.

FIG. 1 is a block diagram illustrating a cluster-based multi-network system 100 for the transfer of data or voice. FIG. 1 shows (G+1) networks 101, 102 and 103, each having at least one and as many as n clusters, where G and n are positive integers. For example, network₁ 101 has n clusters, three of which are labelled clusters 110, 111 and 112. Each cluster, such as cluster₁ 110 has a call server 120, a connection server 130, and a plurality of base stations. For example, cluster₁ 110 has r base stations, two of which are labelled in FIG. 1 with reference numbers 150 and 159. In FIG. 1, the subscript r is a positive integer. Although only one call server 120 and one connection server 130 are shown in cluster₁ 110 of FIG. 110, it should be understood that each cluster may have multiple call servers and multiple connection servers. In any event, each cluster has at least one call server and at least one connection server.

Each cluster, such as the cluster$_1$ 110, also has a plurality of switches for establishing a voice or data path between two end systems. Cluster$_1$ 110, for example, has m switches, two of which are labelled in FIG. 1 with reference numbers 140 and 149. In FIG. 1, the subscript m is a positive integer. In a preferred embodiment of the present invention the switches, such as the switches 140, 149 are asynchronous transfer mode (ATM) switches. Alternatively, however, they may be synchronous transfer mode (STM) switches.

Within each cluster, such as cluster$_1$ 110, there also may be one or more end systems, including fixed and mobile end systems. FIG. 1, for example, shows s end systems currently located within cluster$_1$ 110, where the subscript 5 is a positive integer. Three of the end systems currently located in cluster$_1$ 110 of network$_1$ 101 are labelled with reference numbers 160, 161 and 169. For exemplary purposes, the end systems 160 and 161 are mobile end systems or mobiles, such as cellular telephones, and the end system 169 is a fixed end system. Each mobile end system is assigned a home network, so that, at any given time, a particular mobile end system either may be located in its home network or may be roaming in another network. In addition, each mobile is assigned an address, which uniquely identifies it. The end systems, such as the end systems 160, 161 and 169, and the base stations, such as the base stations 150, 159, use wireless or wired transfer of voice or data.

The transfer of inter-node signalling messages, such as messages or signals sent between a base station and a server or between servers, takes place via either ATM switches, which may by any of the switches 140, 141 or 149 implemented as ATM switches, or signalling transfer points (STPs) 135. Each cluster has a plurality of signalling transfer points. The links interconnecting the nodes or servers in FIG. 1, such as the servers 120, 130, 170, 180 and 190, therefore, may be, for example, connection-oriented ATM signalling virtual channel connections (VCCs) or datagram-oriented links interconnecting servers through routers. Additionally, at least some of the signalling links are multicast signalling links.

In a preferred embodiment of the present invention, provisioned direct signalling or ATM virtual channel connections (VCCs) provide the links between base stations and servers in the same network, whereas datagram-oriented links are used for the connections between nodes, or servers, and base stations located in different networks wherever needed. An exception is made for the links from base stations and connection servers of one network to roamer call servers in all other networks, in which case ATM VCCs are also used in the preferred embodiment.

The functions performed by a call server, such as the call server 120, are cumulatively referred to as call control. For cellular phone and data applications, the call control functions include maintaining a basic call state model for a call, defined as a communication session involving users and servers, and triggering implicit services subscribed to by the users in the call. The call control functions also include handling multiple connections, or end-to-end user information paths, per call, such as multiple audio connections, multiple data connections, or a mixture of audio and data connections.

The functions performed by a connection server, such as the connection server 130, are cumulatively referred to as connection control. The connection control functions include finding routes to establish an end-to-end connection, computing end-to-end quality of service measurements for the connection, establishing, modifying and releasing connections, and handling segments of a connection. A segment is defined as any part of the connection, in other words, a concatenation of channels.

Each switch, such as the switch 140, and each base station, such as the base station 150, has an associated channel server (not shown in FIG. 1). The functions of a channel server include managing channels or user information links on a physical interface of a base station or switch. The functions of a channel server further include setting up translation tables to enable the proper routing of user information across the base station or switch with which the channel server is associated. A channel server associated with a base station also maps virtual channel identifiers (VCIs) to the next switch in the connection to air interface resources, such as frequency, time-slot or code, depending upon the wireless access scheme used.

Each network, such as network$_1$, also has a roamer call server 170, a home location server 180, and a visitor location server 190. The functions of the location servers 180 and 190 include tracking the location of an assigned set of mobile users and responding to requests for the location of these users. The home location server 180 tracks the cluster for its mobiles located in the home network and tracks the visiting network for its mobiles that are roaming. The visitor location server 190 tracks the cluster in which each visiting mobile is located, in contrast to existing networks, in which a VLR tracks both home and visiting mobiles. The roamer call server 170 handles calls for users of network$_1$ 101 which are roaming or visiting another network. Although only one roamer call server 170, one home location server 180, and one visitor location server 190 are shown in cluster$_1$ 110 of FIG. 1, it should be understood that some networks may have multiple roamer call servers, home location servers or visitor location servers. In any event, each network preferably has at least one roamer call server, at least one home location server, and at least one visitor location server.

The location server responsible for tracking the location of a particular mobile is identified by the address of the mobile. The call server handling the calls for a mobile located in its home network and the connection server handling the connections for a particular mobile are identified by the cluster in which the mobile is located. The call server handling the calls for a mobile visiting another network is identified by the network in which the mobile is visiting. In a preferred embodiment of the present invention, the servers 120, 130, 170, 180 and 190 occur in pairs in order to increase reliability.

Figure 2:
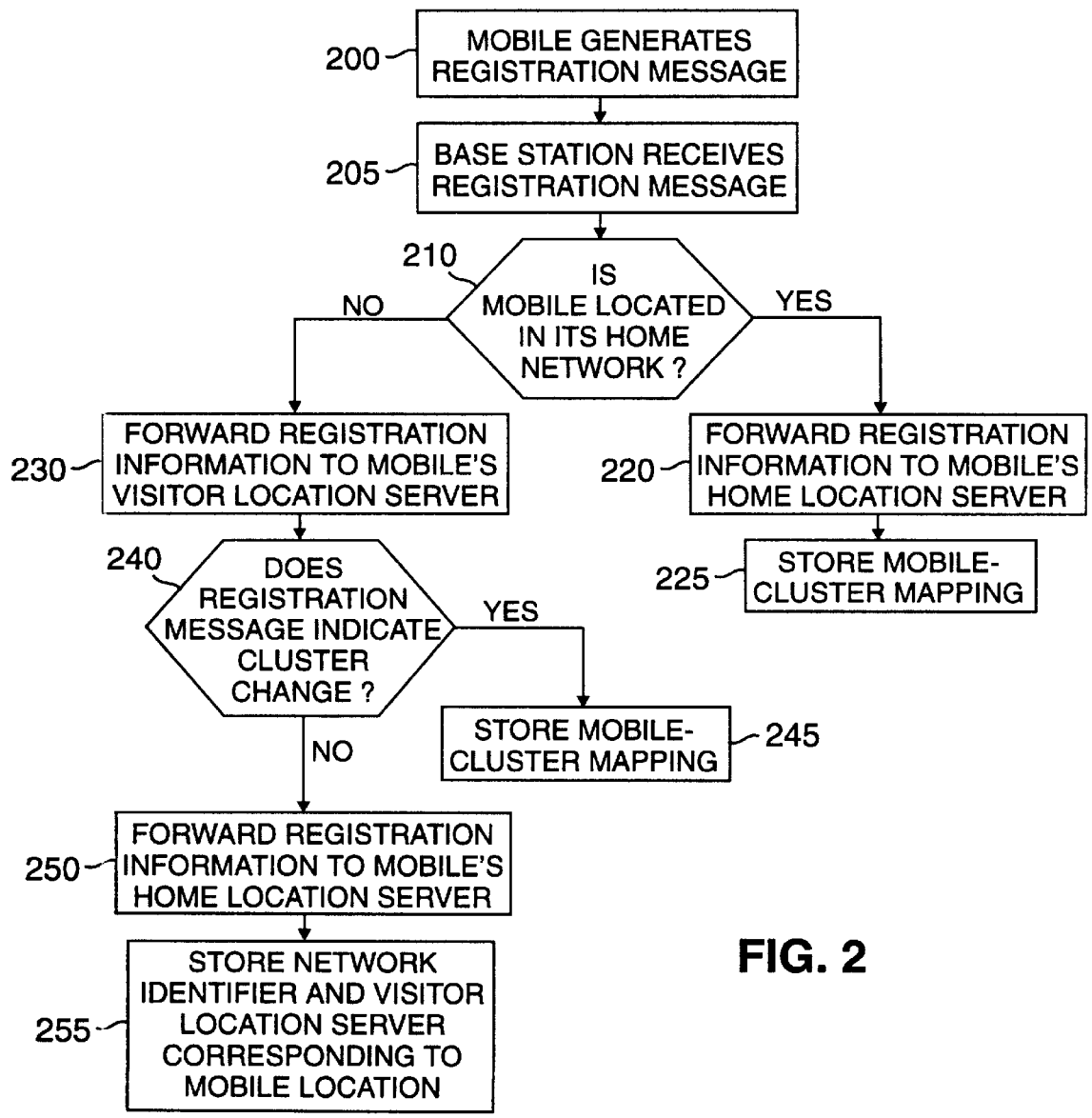
FIG. 2 is a flow diagram showing the steps of a mobile location tracking routine for use in the present invention.

FIG. 2 is a flow diagram showing the steps of a mobile location tracking routine in accordance with the present invention. As shown in step 200, a mobile, such as the mobile end system 160, generates a registration message identifying itself when it turns its power on or off, or when it changes clusters by moving from one cluster to another cluster. Each base station, such as the base station 150, periodically transmits a message identifying the cluster in which it is located. These messages transmitted by the base stations allow a mobile to determine when it changes clusters. Upon receiving a registration message from a mobile as indicated by step 205, a determination is made as to whether the mobile that generated the registration message is located in its home network, as indicated by 210.

As shown in step 220, if the mobile that generated the registration message is in its home network, then the base station that received the registration message forwards the registration information to the home location server for that mobile. Next, as indicated in step 225, the home location server would then store information indicating the cluster in which the mobile is currently located by storing the mobile-to-cluster mapping.

If on the other hand, the mobile that generated the registration message is not located in its home network, then, as shown in step 230, the base station that received the registration message forwards the registration information to a visitor location server located in the same network as the base station and currently tracking the mobile. As indicated by 240, the next step depends upon whether the registration message indicates a cluster change, in other words, that the mobile has moved from one cluster to another cluster within the network. If the registration message indicates a cluster change, then, as shown in step 245, the visitor location server, to which the registration information was forwarded, stores the cluster in which the mobile is currently located by storing the mobile-to-cluster mapping. If the registration message indicates that the mobile is powering up or powering down, then, as indicated in step 250, the visitor location server that received the registration information forwards the registration information to the home location server in the mobile's home network. Finally, as shown in step 255, the home location server in the mobile's home network would store a network identifier and visitor location server identifier corresponding to the location of the mobile. The steps illustrated in FIG. 2 thus represent the mobile location tracking routine.

In a preferred embodiment of the present invention, the base station that received the registration message from a mobile uses bicast signalling VCCs to update both location servers in the pair assigned to the mobile. Also, a timer-based registration occurs in addition to the registration procedures explained above. Timer-based registration messages are generated at a relatively slow rate, for example once each day, and are processed by the visitor location servers for roaming mobiles and by the home location servers for mobiles located in their respective home networks. If, for example, a visitor location server does not receive a timer-based registration from a mobile that previously was roaming within its domain, it deletes the entry for the previously registered mobile. This timer-based registration procedure obviates the need for a registration cancellation procedure from the home location server to a previous visitor location server, as is presently done in the current IS-41 and GSM standards.

Figure 3:
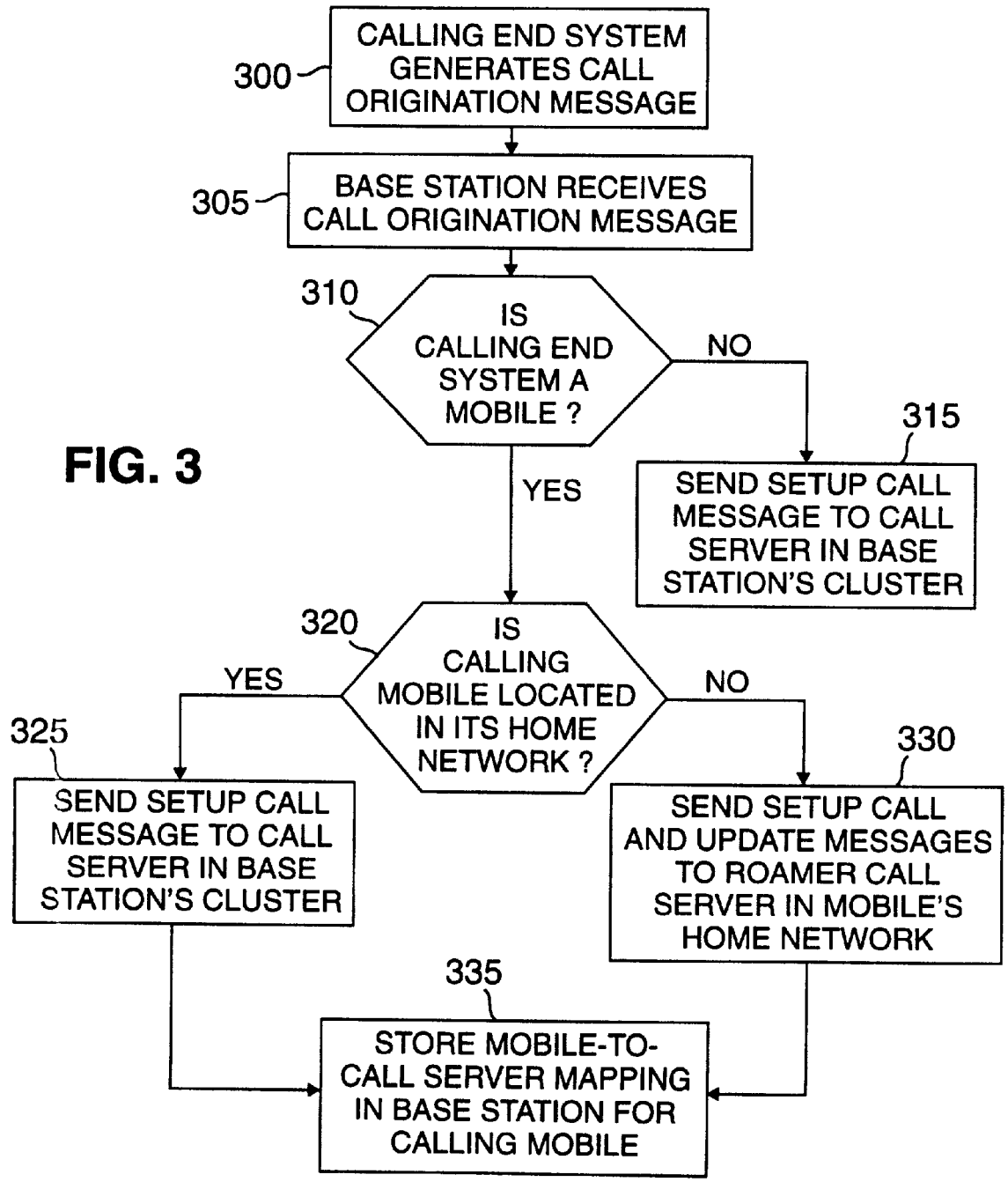
FIG. 3 is a flow diagram illustrating the initial steps of a call control routine for a call originating in a mobile.
Figure 4:
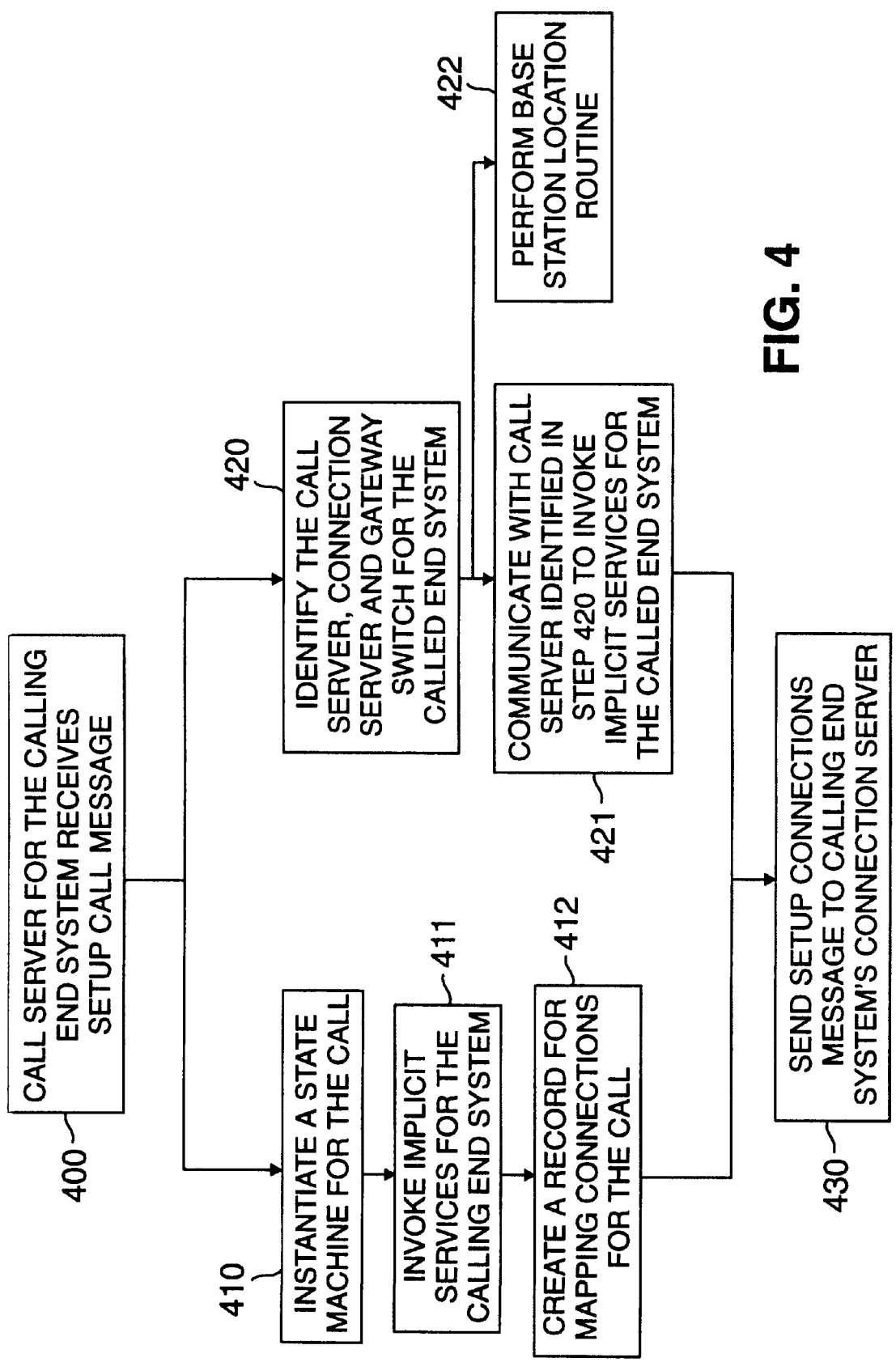
FIG. 4 is a flow diagram showing further steps in the call control routine.

FIGS. 3 and 4 are flow diagrams illustrating the steps of a call control routine for use in conjunction with the present invention. As shown in step 300 of FIG. 3, a calling end system, such as the mobile 160 or the fixed end system 169, generates a call origination message indicating that it wishes to call a particular called end system. The remaining steps of FIG. 3 and FIG. 4, with the exception of step 422 in FIG. 4, illustrate the call control routine. As illustrated in step 305, the base station covering the area in which the end system is located receives the call origination message. A determination is made as to whether the end system that generated the call origination message is a mobile, as shown by 310. If the calling end system is not a mobile, but rather is fixed, then, as indicated in step 315, the base station sends a setup call message to the call server covering the cluster in which the base station is located. If, on the other hand, the calling end system is a mobile, then a determination is made as to whether the calling mobile is located in its home network, as indicated by 320. A setup call message is sent to the call server serving the calling mobile. More particularly, if the calling mobile is located in its home network, then, as illustrated in step 325, the base station sends a setup call message to the call server covering the cluster in which the base station and mobile located. In contrast, if the calling mobile is not located in its home network, then the base station sends a setup call message to the roamer call server located in the mobile's home network as shown in step 330. In this latter situation, the base station also sends an update message to the roamer call server indicating the identity of the connection server in the cluster where the mobile is presently located. The identity of the connection server received in the update message is used by the roamer call server, as explained further below, to request that the connections needed to connect the call be set up. Finally, as indicated in step 335, when the calling end system is a mobile, the base station stores the mobile-to-call server mapping needed to handle subsequent requests from the mobile.

FIG. 4 illustrates additional steps which are performed as part of the call control routine. As indicated in step 400, a call server for the calling end system receives the setup call message. As explained above, this call server will be either the call server in the cluster in which the base station is located or the roamer call server that is associated with the end system's home network. Upon receiving the setup call message, a call server instantiates or creates a state machine for the call, as shown in step 410. Next, as indicated in step 411, the call server invokes implicit services for the calling end system. Then, the call server creates a record for mapping connections to the call as shown in step 412.

The call server that received the setup call message additionally performs several steps concurrently with the steps 410–412. Specifically, as indicated by step 420, the call server that received the setup message identifies the call server, the connection server and the gateway switch for the called end system. A gateway switch is the switch that interconnects two networks. When the called end system is a fixed end system, then this information may be retrieved from a database. When the called end system, however, is a mobile, then further processing is required to obtain this information, as explained below with reference to FIG. 5. Next, as indicated in step 421, the call server that received the setup message communicates with the call server identified in step 420 to invoke implicit services for the called end system.

According to the principles of the present invention, if the called end system is a mobile, then a base station location routine is performed concurrently or in parallel with step 421, as indicated by step 422. The base station location routine, as explained further below, determines which base station, within the cluster where the called mobile is currently located, is serving the called mobile. This information is subsequently used when the connections for the call are established. By performing the base station location routine in parallel with the call control functions of step 421 the delays in establishing the connections for the call are decreased.

Once the steps 410–412 and 420–421 have been performed, the call server that received the setup message sends a setup connections message to the connection server for the calling end system, as shown in step 430. The connection server for the calling end system is the connection server covering the cluster in which the calling end system is currently located. In a setup connections message, the call server sending the message specifies the connection server and gateway switch for the called end system which were identified in the step 420.

Figure 5A:
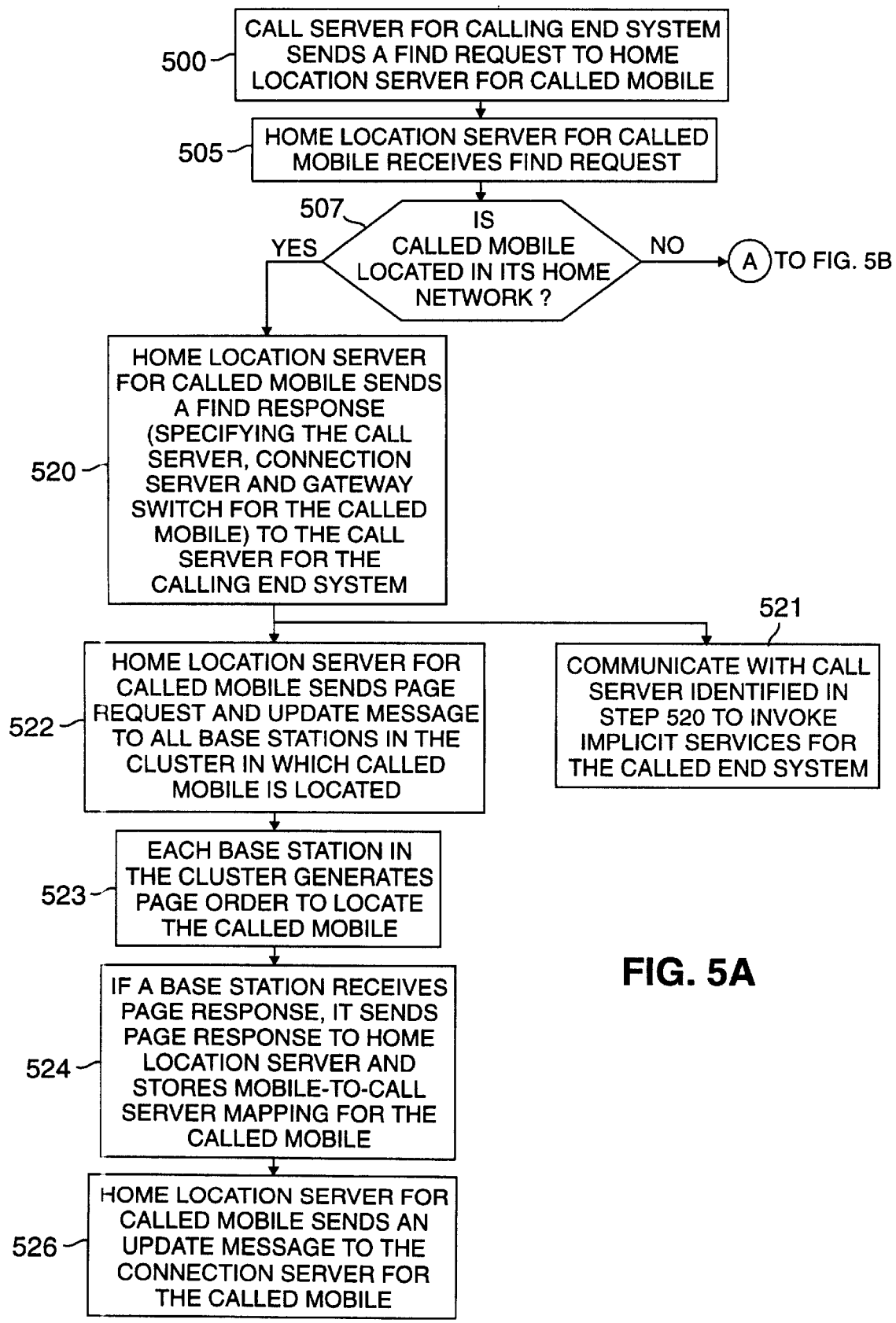
FIGS. 5A and 5B are a flow diagram illustrating in greater detail several of the steps of the call control routine and a base station location routine.
Figure 5B:
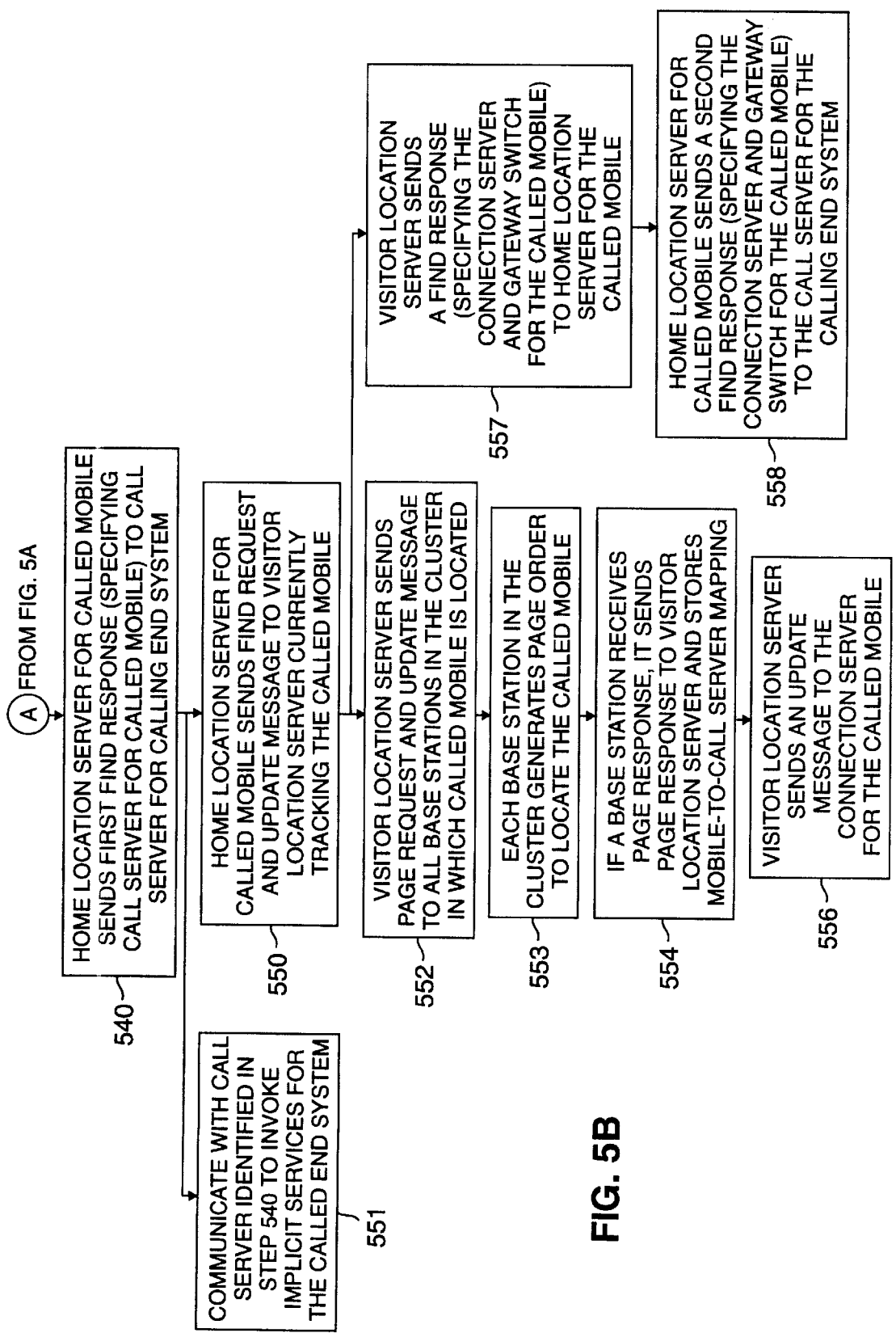

FIGS. 5A and 5B are a flow diagram illustrating in greater detail several of the steps of the call control routine and the base station location routine. In particular, FIGS. 5A and 5B illustrate the details of the steps 420 and 422 when the called end system is a mobile. First, as shown in step 500, the call server for the calling end system, sends a find request to the home location server for the called mobile. The call server for the calling end system is the call server that received the setup call message in the step 400. In step 505, the home location server for the called mobile receives the find request. As indicated by 507, a determination is made as to whether the called mobile is located in its home network.

If the called mobile is located in its home network, then, as indicated by step 520, the home location server for the called mobile sends a find response to the call server for the calling end system. This find response would specify the call server, the connection server and the gateway switch for the called mobile. It should be noted that the home location server for the called mobile knows the cluster in which the called mobile is currently located, and hence the connection server and gateway switch, based upon the mobile location tracking routine. Thus, where the called end system is a mobile located in its home network, step 420 comprises the steps 500, 505, 507 and 520.

Next, as shown in step 522, the home location server for the called mobile sends a multicast page request and an update message to all the base stations in the cluster in which the called mobile is presently located. The page request and update message may be sent on a multicast signalling link. The update message includes an identification of the call server for the called mobile. Next, as indicated in step 523, each base station in the cluster generates a page order message to locate the called mobile.

If one of the base stations in the cluster receives a page response from the called mobile indicating that the called mobile is within the domain of that base station, then, as shown in step 524, the base station sends a page response to the home location server for the called mobile. The base station that received the page response would also store the mobile-to-call server mapping for the called mobile. The home location server for the called mobile also sends an update message to the connection server for the called mobile specifying the base station associated with the called mobile as shown in step 526. The connection server for the called mobile subsequently uses this information to route the connection. Thus, where the called end system is a mobile located in its home network, the base station location routine comprises the steps 522, 523, 524 and 526. As explained above, the base station location routine is performed concurrently with the call control step 421, which, for convenience, is shown in FIG. 5A as step 521.

If the called mobile is roaming and is not presently located in its home network, then, as indicated in step 540 of FIG. 5B, the home location server for the called mobile sends a first find response to the call server for the calling end system. This first find response specifies the call server for the called mobile and allows the call server serving the calling end system to proceed with step 421 in FIG. 4, without awaiting completion of step 420. For convenience, step 421 is also shown as step 551 in FIG. 5B. Further processing, however, is required to determine the connection server and gateway switch for the called mobile because only the visitor location server tracks the cluster in which a roaming mobile is located as indicated by the mobile location tracking routine of FIG. 2.

In step 550, the home location server for the called mobile sends a find request and an update message to the visitor location server currently tracking the called mobile. Again, it should be noted that the home location server for the called mobile knows the network in which the mobile is currently located and the identification of the associated visitor location server based upon the mobile location tracking routine. The update message in step 550 specifies the call server for the called party.

Upon receiving the find request, the visitor location server for the called mobile sends a find response to the home location server for the calling end system, as indicated in step 557. This find response would specify the connection server and the gateway switch for the called mobile. The home location server for the called mobile then sends a second find response to the call server for the calling end system as indicated in step 558. This second find response specifies the connection server and the gateway switch for the called mobile. Thus, where the called end system is a roaming mobile, step 420 comprises steps 500, 505, 507, 540, 550, 557 and 558.

Upon receiving the find request in step 550, the visitor location server for the called mobile also sends a multicast page request and an update message to all the base stations in the cluster in which the called mobile is presently located, as indicated by step 552. The page request and update message in step 552 are similar to the corresponding request and message in step 522. Each base station in the cluster generates a page order to locate the called mobile, as shown in step 553.

If one of the base stations in the cluster receives a page response from the called mobile indicating that the called mobile is within the domain of that base station, then, as shown in step 554, the base station sends a page response to the visitor location server for the called mobile. The base station that received the page response would also store the mobile-to-call server mapping for the called mobile. The visitor location server for the called mobile also sends an update message to the connection server for the called mobile specifying the base station associated with called mobile as shown in step 556. The connection server for the called mobile subsequently uses this information to route the connection. Thus, where the called end system is a roaming mobile, the base station location routine comprises the steps 552, 553, 554 and 556. As explained above, the base station location routine is performed in parallel or concurrently with call control step 551.

Figure 6:
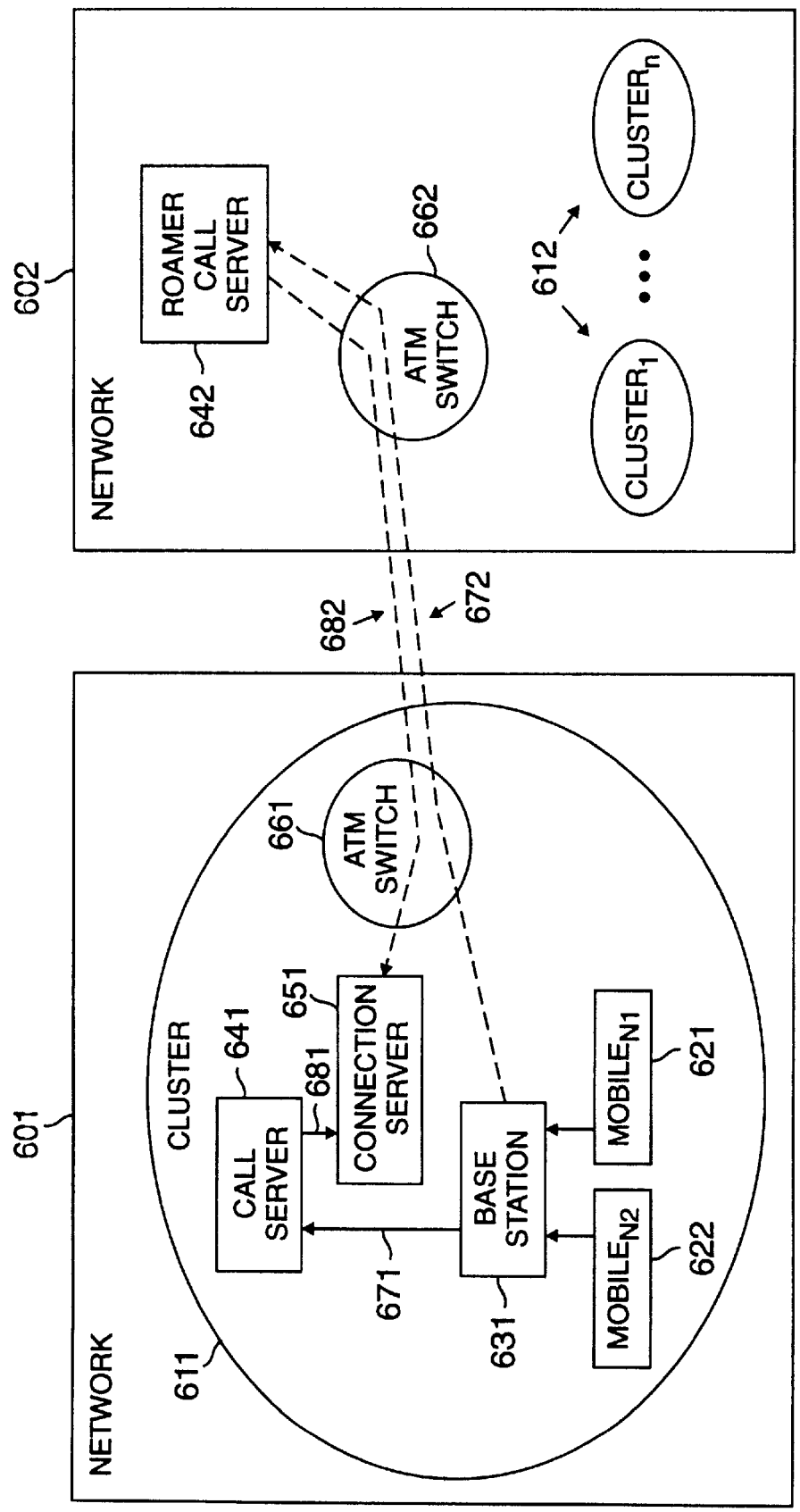
FIG. 6 illustrates the use of several direct signalling, links used in the call control routine of FIGS. 4 and 5 for a roaming mobile according to the principles of the present invention.

FIG. 6 illustrates the use of several direct signalling links used in the call control routine of FIGS. 4 and 5 for a roaming mobile according to the principles of the present invention. FIG. 6 shows two networks 601 and 602. The networks 601, 602 may be part of the multi-network configuration shown in FIG. 1. It will be noted, however, that, for the purpose of ease and clarity of presentation, certain components of the networks are not shown in FIG. 6. Network 601 has at least one cluster 611, and network 602 has a plurality of clusters 612, labelled cluster$_1$ through cluster$_n$. At some given time, mobile$_{N1}$ 621 and mobile$_{N2}$ 622 are located within the domain of cluster 611. Mobile$_{N1}$ 621 is located in its home network, the network 601, whereas the mobile$_{N2}$ 622, whose home network is the network 602, is roaming in the network 601.

If either mobile$_{N1}$ 621 or mobile$_{N2}$ 622 generates a wireless call origination message, as indicated by step 300 of FIG. 3, then a base station 631, located in the cluster 611, receives the message. If the mobile$_{N1}$ 621 generated the message, then the base station 631 sends a setup call message to a call server 641 located within the cluster 611 according to the step 315 of FIG. 3. The link between the base station 631 and the call server 641 is represented by line 671. Upon receiving the setup call message as indicated in step 400, the call server 641 sends a setup connections message to a connection server 651 located within the cluster 611 as indicated in step 430. The link between the call server 641 and the connection server 651 is represented by line 681.

If, on the other hand, the roaming mobile$_{N2}$ 622 generated the call origination message, then the base station 631 sends setup call and update messages to a roamer call server 642, located within the domain of the home network 602 of mobile$_{N2}$ 622, via ATM switches 661, 662. The link from the base station 631 to the roamer call server 642 via the ATM switches 661, 662 is shown by a dashed line 672. The roamer call server 642 then sends a setup connections message to the connection server 651 via the ATM switches 662, 661. The link between call server 642 and the connection server 651 is represented by line 682. In particular, this arrangement permits roaming mobiles to contact their home networks for services at all times, thereby obviating the need for sharing of competitive information and the need for passing signalling information for mobiles when they are not involved in the call.

Figure 7:
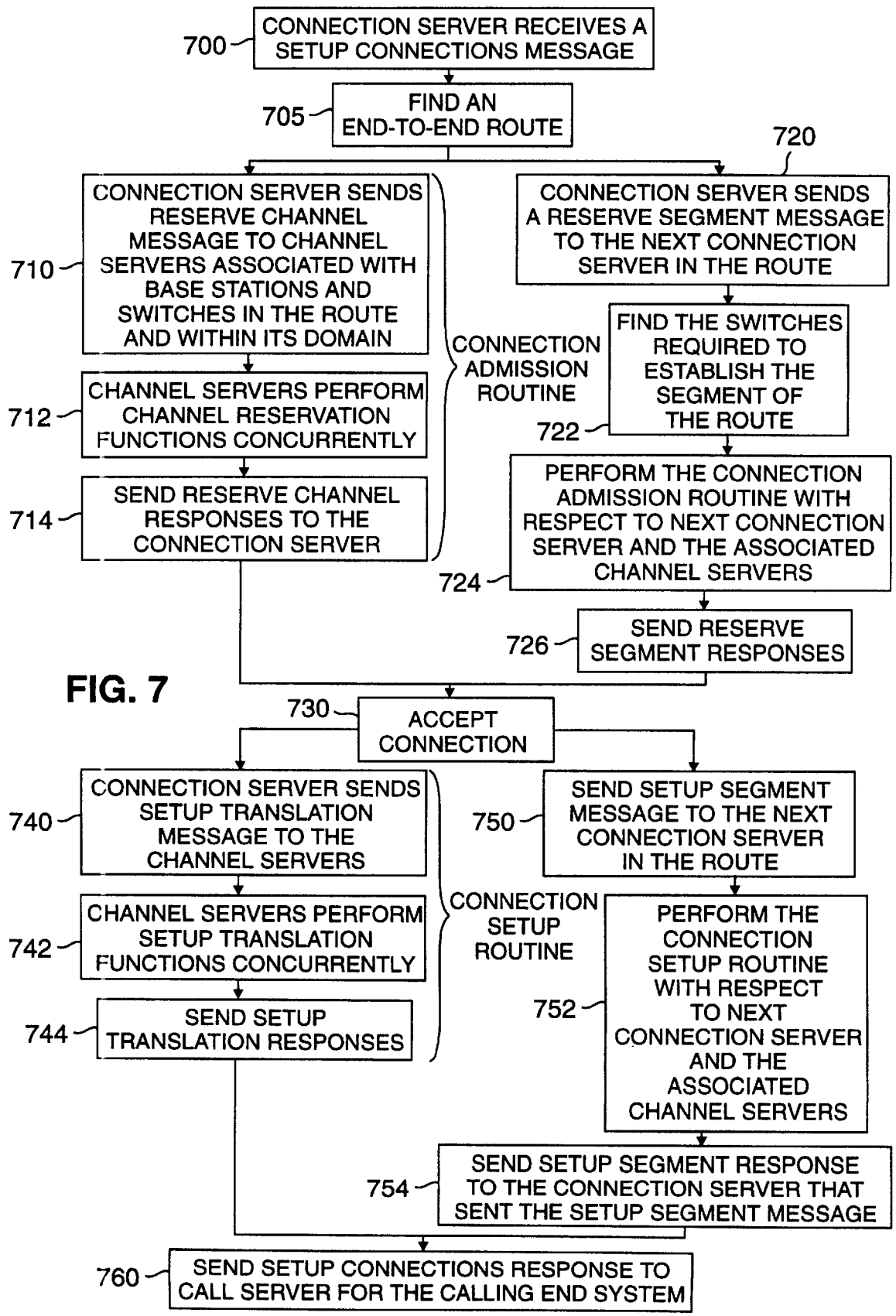
FIG. 7 is a flow diagram showing the steps of a connection establishment routine according to the principles of the present invention.

FIG. 7 is a flow diagram showing the steps of a connection establishment routine according to the principles of the present invention. Once a setup connections message is sent as indicated in step 430 of FIG. 4, the connection server to which the setup message was sent receives the setup connections message, as shown in step 700. Next, as indicated by step 705, the connection server which received the setup connections message finds a route for the call from the calling end system to the called end system.

Figure 8:
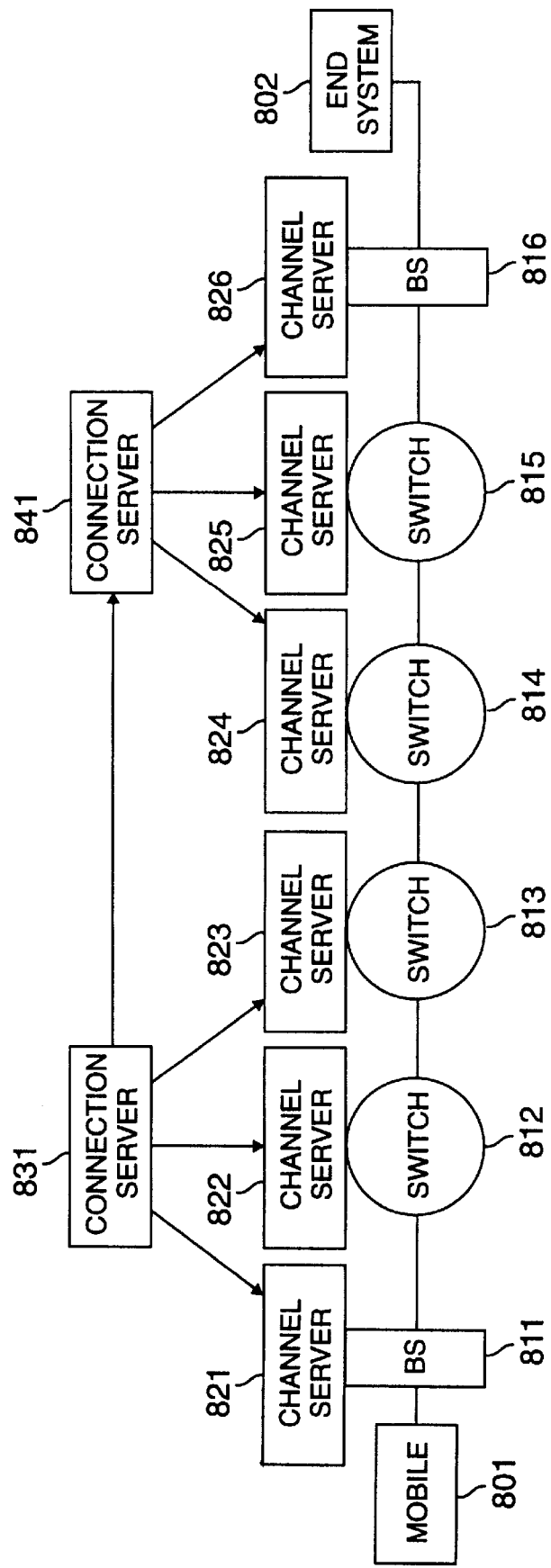
FIG. 8 illustrates an exemplary route for connecting a call from one end system to another end system.

The connection establishment routine may be more readily understood with reference to FIG. 8 which illustrates an exemplary route for connecting a call from an end system, such as the mobile 801, to another end system 802. In the example illustrated in FIG. 8, it is assumed that the mobile 801 is located in an area covered by a base station 811 which is located in a cluster covered by a connection server 831. Also, it is assumed that the end system 802 is located in another cluster covered by a connection server 841. Assuming further that the connection server 831 receives the setup connections message associated with the call, then it finds a route from the mobile 801 to the end system 802. In the particular example illustrated, the route includes two segments, one which comprises the base station 811 and the ATM switches 812, 813, that are within the domain of the connection server 831. The second segment comprises a plurality of switches within the domain of the connection server 841.

The connection server which received the setup connections message then performs the following functions which may be performed concurrently. In step 720, the connection server which received the setup connections message sends a reserve segment message to the next connection server in the route found in the step 705. In the example shown in FIG. 8, the connection server 831 would send a reserve segment message to the connection server 841. If there are other connection servers that make up additional segments of the route, then a reserve segment would be sent to them as well in a hop-by-hop manner. Additional action taken by the connection server 841 upon receiving the reserve segment message is discussed further below. In step 710, the connection server that received the setup connections message also sends a multicast reserve channel message to each channel server that is associated with a base station or switch in the route and that is within the connection server's domain. In the example of FIG. 8, the connection server 831 would send a reserve channel message to channel servers 821, 822 and 823, which are the channel servers associated with the base station 811 and the ATM switches 812, 813, respectively.

Each channel server which receives a reserve channel message then performs channel reservation functions as indicated in step 712. The channel reservation functions include checking switch resources, and allocating VCI and bandwidth. Upon performing the channel reservation functions, each channel server sends a channel response to the connection server from which it received the reserve channel message, as indicated in step 714.

The steps 710, 712 and 714 may be conveniently referred to as a connection admission routine. In contrast to known techniques for performing call admission control, the connection admission routine of the present invention is preferably performed concurrently for each of the channel servers in a particular segment of the route. This parallel functioning is possible because of the capabilities of the asynchronous transfer mode (ATM) technology which include the use of multicast signalling links. Thus, in the example of FIG. 8, each of the channel servers 821–823 would perform channel reservation functions concurrently, thereby resulting in smaller delays in establishing the connection for the call. It should be understood that performance of functions by the channel servers concurrently includes, but is not limited to, performance of the functions in a synchronous or lock-step manner. Performance of functions by the channel servers concurrently is intended, however, to encompass more than lock-step performance. As used herein in relation to the concurrent operation of the channel servers, operating or functioning concurrently is used in contrast to sequential operations in which one switch and its associated channel server cannot perform the specified function until a previous switch in the route, and its associated channel server, have performed the same or a similar function. The channel reserved responses, therefore, may be sent asynchronously.

The connection server that received a reserve segment message in step 720 finds the switches required to establish its segment of the route as indicated by step 722. Referring again to FIG. 8, the connection server 841 would find ATM switches 814 and 815 and base station 816 within its domain to establish the second segment of the route from the mobile 801 to the end system 802. The switches 814, 815 and the base station 816 have associated channel servers 824, 825 and 826, respectively. Next, in step 724, the connection admission routine, comprising the steps 710, 712 and 714, is performed with respect to the connection server that received the reserve segment message as well as the channel servers associated with the segment of the route within the domain of that connection server. Finally, in step 726, the connection server sends a reserve segment response to the connection server from which it received the setup segment message. Thus, referring to FIG. 8, the connection server 841 would send a reserve segment response to the connection server 831 indicating that the segment of the route within its domain has been reserved.

Once the connection server that received the setup connections message in step 700 receives the reserve channel responses and the reserve segment responses, it computes the end-to-end characteristics of the reserved connection and compares the resulting quality of service with any requirements specified in the setup connections message.

A determination is made whether to accept or reject the connection. If the connection is accepted, as indicated by step 730, then the connection server which received the setup connections message sends setup segment messages to the other connection servers in the route and setup translation messages to the channel servers that are in the route and that are within its domain, as shown in steps 750 and 740, respectively. Upon receiving a setup translation message, each channel server performs setup translation functions as shown in step 742. The setup translation functions include establishing VPI/VCI translations, establishing parameters for Usage Parameter Control, priority control, and traffic shaping and fault handling algorithms in the associated ATM switch or base station. Upon completing the setup translation functions, each channel server sends a setup translation response to the connection server which sent the setup translation message to it, as indicated by step 744.

The steps 740, 742 and 744 may be conveniently referred to as a connection setup routine. In contrast to known techniques for performing connection setup and fabric control, the connection setup routine of the present invention is preferably performed concurrently for each of the channel servers in a particular segment of the route. Again, the parallel functioning is possible because of the capabilities of the asynchronous transfer mode (ATM) technology which include the use of multicast signalling links. Thus, in the example of FIG. 8, each of the channel servers 821–823 would perform setup translation functions concurrently, thereby resulting in smaller delays in establishing the connection for the call. Again, as used herein in relation to the concurrent operation of the channel servers, operating or functioning concurrently is used in contrast to sequential operations in which one switch and its associated channel server cannot perform the specified function until a previous switch in the route and its associated channel server have performed the same or a similar function. The setup translation responses may, therefore, be sent asynchronously.

The connection setup routine is also performed, as shown in step 752, with respect to each connection server that received a setup segment message in the step 750 as well as the channel servers associated with the segment of the route within the domain of each such connection server. Next, in step 754, each connection server that received a setup segment message then sends a setup segment response to the connection server that sent the setup segment messages.

Once the connection server that received the setup connections message in step 700 receives the setup translation responses and the setup segment responses, it sends, as shown in step 760, a setup connections response to the call server for the calling end system. The setup connections response indicates that the connection for the call to the called end system has been established.

Figure 9:
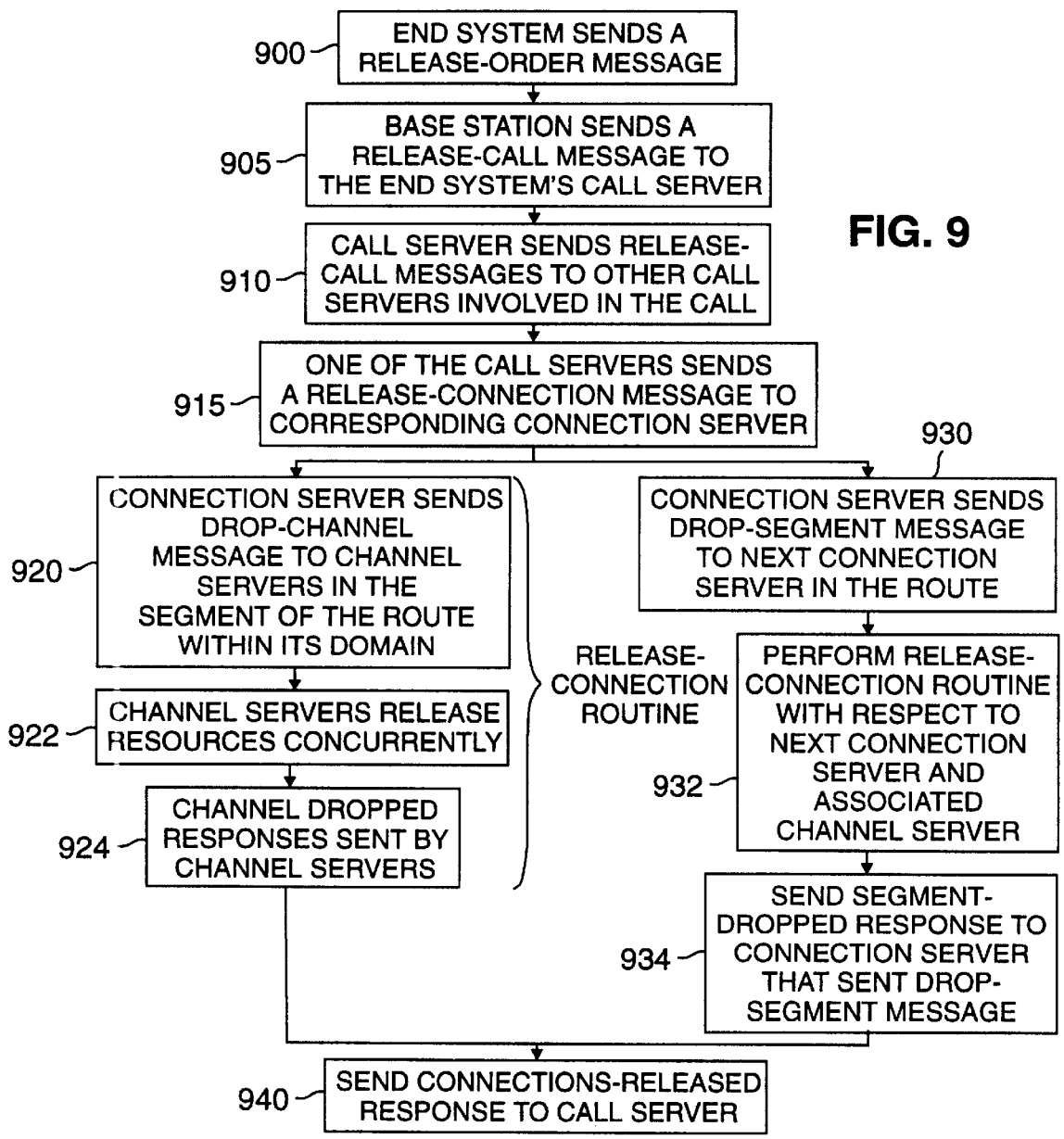
FIG. 9 is a flow diagram showing the steps of a release-call routine according to the principles of the present invention.

According to the principles of the present invention, operations to release the connections associated with a call also take place concurrently in a plurality of channel servers. FIG. 9 is a flow diagram illustrating the steps of a release-call routine according to the principles of the present invention. Either end system involved in a call, the calling end system or the called end system, can initiate the release of the call and its connections by generating and sending a release-order message as indicated in step 900. Upon receiving such a release-order message, the base station, in whose area the end system that sent the message is presently located, sends a release-call message to the call server for the end system which generated the release-order message, as shown in step 905. It will be recalled that the respective base stations for the calling and called end systems involved in the call stored the identity of the respective call servers involved in the call.

In step 910, the call server to which the release call message was sent then sends a release-call message to any other call servers involved in the call of which it is aware. Next, in step 915, the call server that has a record of the connections in the call pursuant to step 412 in FIG. 4 sends a release-connection message to the appropriate corresponding connection server. The release-connection message instructs the connection server to release the active connections in the call.

Upon receiving the release-connection message, the connection server initiates a release-connection routine which comprises steps 920, 922 and 924. In step 920, the connection server which received the release-connection message sends a drop-channel message to each channel server in the segment of the route within its domain. Drop-channel messages, which are multicast to the channel servers, instruct the channel servers to release the channel and translation resources used for the call. According to the principles of the present invention, as shown in step 922, the channel servers then preferably concurrently release the resources for the call, including VCI and bandwidth. The releasing of the resources by the channel servers concurrently or in parallel contrasts to known techniques for performing connection release procedures serially and results in smaller delays in dropping a call, thereby freeing the channel servers and other system components for use in other calls. Finally, in step 924, the channel servers send dropped-channel responses to the connection server from which they received the drop-channel messages. The dropped-channel responses may be sent asynchronously.

Concurrently with initiating the release connections routine, the connection server that received the release-connection message in step 915 also sends a drop-segment message to the next connection server in the route, as shown in step 930. Then, as indicated in step 932, the release-connection routine is performed with respect to the next connection server and the associated channel servers. Next, in step 934, a segment-dropped response is sent to the connection server that sent the drop-segment message.

Once the connection server which received the release-connection message in step 915 receives the responses from the channel servers and the other connection servers in the route, it sends a connections-released response to the call server that sent the release-connection message, as indicated in step 940. The release-call routine, which starts with step 900, thus ends with step 940 when the connections-released response is received indicating that all connections in the route for the call have been dropped.

Figure 10:
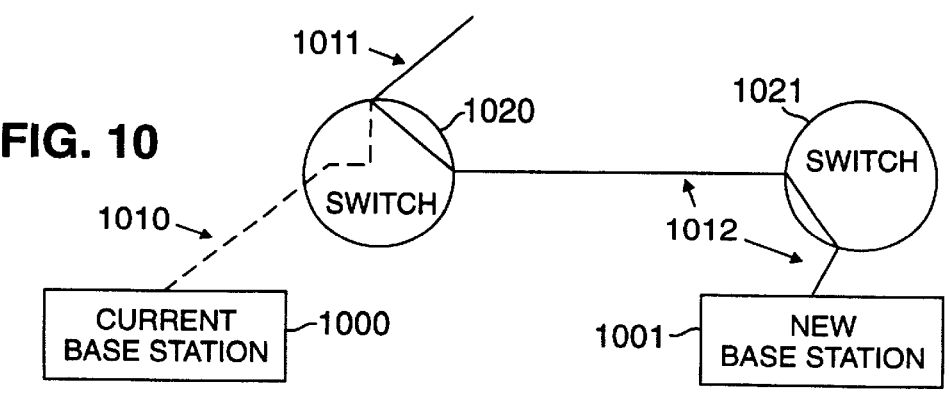
FIG. 10 illustrates a handoff routine according to the principles of the present invention.

FIG. 10 illustrates a handoff routine according to the principles of the present invention. A handoff can occur as a mobile moves from within the vicinity of one base station to the vicinity of another base station. According to the principles of the present invention, the separation of call control and connection control functions, which are performed by the call servers and connection servers, respectively, obviates the need for a mobile switching center (MSC) or other switch to be anchored for the duration of the call.

When a mobile leaves the vicinity of a previous base station 1000 and moves into the vicinity of a new base station 1001, it generates a handoff-order message, which is received by the new base station 1001. The new base station 1001 then forwards the handoff-order message to the previous base station 1000 as identified in the handoff-order message, where the previous base station 1000 comprises a first end of the old segment. The channel server associated with the previous base station 1000 invokes a handoff-segment operation which identifies a switch 1020 as the second end of the old segment and which identifies a channel 1010 as the channel being handed off. This information is then included in a handoff segment message sent to the new base station 1001.

Upon receiving the handoff segment message, a hop-by-hop process is initiated to establish a new segment 1012 from the base station 1001 to the switch 1020. The new segment may pass through other switches, such as switch 1021. The channel server associated with the switch 1020 sets up the new translation from a remaining channel 1011 of the old route to a channel associated with the new segment 1012 after deleting the translation to the channel being handed off. In the hop-by-hop process, the identities of all the channel servers in the switches between the new base station 1001 and the switch 1020 are identified to the channel server associated with the switch 1020. The channel server associated with the switch 1020 then communicates the change in the segment to the connection server responsible for the old segment.

An analysis was performed to determine an approximate optimal cluster size corresponding to which servers are not overloaded and the number of signalling links from each server type is not exceedingly large. Several assumptions were made in the analysis, including the following. The networks were assumed to be identical, and two visitor server pairs were assumed for each network. One roamer server pair was assumed in a particular network for every other network in which the particular network's mobiles may roam. Updates and queries to location servers within a pair are assumed to be issued on bicast links. Answers to queries are generated according to an arrangement between the two location servers in the pair. When one server in the pair is not functional, the other server can handle all the queries made to the pair. It is further assumed that no handoffs occur during call setup, connection setup or release procedures. No crossnetwork idle or active handoffs are assumed to take place.

FIGS. 11A, 11B and 11C show exemplary values of certain input parameters used in the analysis, including additional input parameters for connection server utilization analysis and base station analysis. FIG. 12 shows the resulting values of other parameters based upon the exemplary input values listed in FIGS. 11A–C, and assuming clusters whose perimeter is seventy miles long and base stations covering an area of twenty-five square miles. In particular, the base station and connection server utilization remain below a value of one. These values may offer a viable operating point for a network designed with the aforementioned assumptions.

Although the present invention has been described with reference to specific embodiments, it will be appreciated that other arrangements within the spirit and scope of present invention will be readily apparent to persons of ordinary skill in the art. The present invention is, therefore, limited only by the appended claims.

We claim:

1. A method of tracking the location of a mobile having a home network, said method comprising the steps of:
   generating a registration message;
   performing the following steps if said mobile is located in its home network;
   (a) forwarding registration information to a home location server for said mobile; and
   (b) storing a mobile-to-cluster mapping for said mobile in said home location server; and
   performing the following steps if said mobile is not located in its home network:
   (a) forwarding said registration information to a visitor location server tracking said mobile;
   (b) storing a mobile-to-cluster mapping for said mobile in said visitor location server if said registration message indicates a cluster change;
   (c) forwarding said registration information to said home location server for said mobile if said registration message indicates that said mobile is powering up or powering down; and
   (d) storing in said home location server network identifier and visitor location server identifier corresponding to the location of said calling mobile.

2. A method of releasing a call from a calling end system to a called end system to a called end system, where at least either said calling end system or said called end system is a mobile, said method comprising the steps of:
   generating a release-order message;
   sending a release-call message to call servers involved in said call;
   sending a release-connection message to a connection server corresponding to the one of said call servers which has a record of connections involved in said call; and
   performing a release-connection routine wherein resources, which are used in a plurality of channel servers for releasing connections and managing switch resources, said channel servers associated with base stations and switches which form a segment of a route for said call, are released concurrently, wherein said release-call routine further comprises the step of sending a multicast drop channel message to said plurality of channel servers.

3. A method of handing off a call comprising the steps of:
   generating a handoff-order message identifying a previous base station which comprises a first end of an old route for said call;
   forwarding said handoff-order message to said previous base station;
   sending a handoff segment message from a channel server associated with said previous base station to a new base station;
   establishing in response to the handoff segment message a new segment of a route for said call from said new base station to a switch identified as a second end of said old segment by setting up a translation table of switch resources for the new segment;
   setting up a new translation from a channel in said old route to a channel associated with said new segment;
   identifying to said switch each channel server involved in said new segment; and
   communicating to a connection server responsible for said old segment the change from said old segment to said new segment.

4. A roamer call server for use in a first home network in conjunction with a distributed control multi-network telecommunication system, said roamer call server comprising:
   a processor for handling call control functions for users of the first home network who are roaming or visiting another network;
   memory for storing user profile information for said users;
   an input for receiving a request to provide call control functions for a roaming user visiting another network; and an output for providing call control functions including a basic call state model for a call and for triggering implicit services subscribed to by said roaming user consistent with the stored user profile information, whereby mobiles of roaming users are permitted to contact the first home network for services at all times, thereby obviating the need for different networks to share competitive information.

5. A method of setting up a call from a calling end system to a called end system, where at least either said calling end system or said called end system is a mobile, said method comprising the steps of:

generating a call origination message;

performing a call control routine for said call; and performing a connection establishment routine comprises the steps of:
(a) receiving a setup connections message;
(b) finding a route from said calling end system to said called end system for said call;
(c) performing a connection admission routine with respect to each segment of said route; and
(d) performing a connection setup routine with respect to each segment of said route;

wherein said connection admission routine comprises the step of performing channel reservation functions concurrently in a plurality of channel servers associated with base stations and switches which form a segment of said route and wherein said connection setup routine comprises the step of performing setup translation functions concurrently in said plurality of channel servers.

6. The method of claim 5, wherein said connection admission routine comprises the step of sending a multicast reserve channel message to said plurality of channel servers.

7. The method of claim 5, wherein said connection setup routine further comprises the step of sending a multicast setup translation message to said plurality of channel servers.

8. A method of setting up a call from a calling end system to a called end system, where at least either said calling end system or said called end system is a mobile, said method comprising the steps of:

generating a call origination message;

performing a call control routine for said call; and performing a connection establishment routine for said call;

wherein said call control routine comprises the steps of:
(a) sending a setup call message to a call server serving said calling end system;
(b) creating a state machine for said call;
(c) invoking implicit services for said calling end system;
(d) creating a record for mapping connections for said call;
(e) identifying a call server serving said called end system, a connection server for said called end system and a gateway switch for said called end system;
(f) communicating with said call server for said called end system to invoke implicit services for said called end system; and
(g) sending a setup connections message to a connection server for said calling end system;

and wherein the steps (b), (c) and (d) of said call control routine are performed concurrently with the steps (e) and (f) of said call control routine.

9. The method of claim 8 wherein the step of sending a setup call message to a call server serving said calling end system comprises the steps of:

sending a setup call message to a call server located in the same cluster as said calling end system if said calling end system is a mobile located in its home network; and sending a setup call message to a roamer call server located in the home network of said calling end system if said calling end system is a mobile which is not located in its home network.

10. The method of claim 8 wherein the step of identifying comprises the following steps if said called end system is a mobile located in its home network;

sending a find request to a home location server for said called end system; and sending a find response to the call server serving said calling end system, wherein said find response specifies the call server serving said called end system, the connection server for said called end system and the gateway switch for said called end system.

11. The method of claim 8 wherein the step of identifying comprises the following steps if said called end system is a mobile located in its home network;

sending a find request to a home location server for said called end system;

sending a find request from said home location server to a visitor location server tracking said called end system;

sending a find response from said visitor location server to said home location server; and sending at least one find response from said home location server to the call server to the call server serving said calling end system.

12. The method of claim 8 wherein the step of sending at least one find response to said call server serving said calling end system comprises the steps of:

sending a first find response specifying the call server serving said called end system; and sending a second find response specifying the connection server for said called end system and the gateway switch for said called end system.

13. The method of claim 8 further including the step of performing a base station location routine if said called end system is a mobile, where said base station location routine is performed in parallel with step (f) of claim 12.

14. The method of claim 13 wherein said base station location routine comprises the following steps if said called end system is located in its home network:

sending a page request from a home location server for said called end system to all base stations located in the same cluster as said called end system;

generating a page order from each of said base stations; and sending a page response to said home location server.

15. The method of claim 14 wherein said step of sending a page request comprises sending a multicast page request.

16. The method of claim 13 wherein the base station location routine comprises the following steps if said called end system is not located in its home network;

sending a page request from a visitor location server for said called end system to all base stations located in the same cluster as said called end system;

generating a page order from each of said base stations; and sending a page response to said visitor location server.

17. The method of claim 16 wherein said step of sending a page request comprises sending a multicast page request.

* * * * *